June 6, 1933.  W. L. BRYANT  1,912,618
GAUGE
Filed Dec. 12, 1928
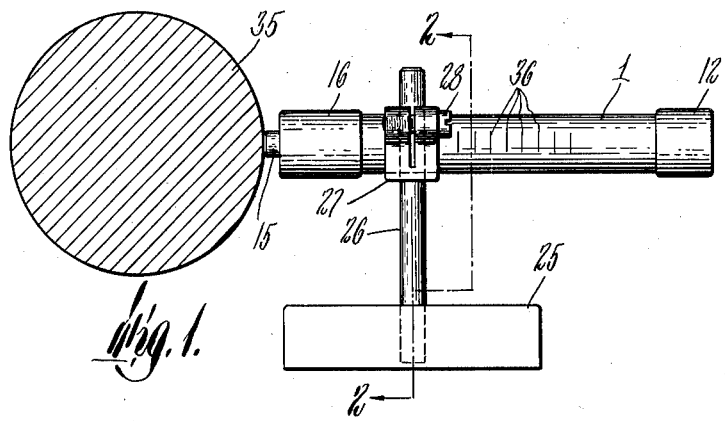
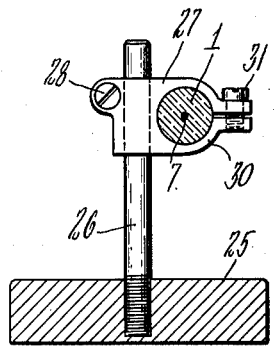
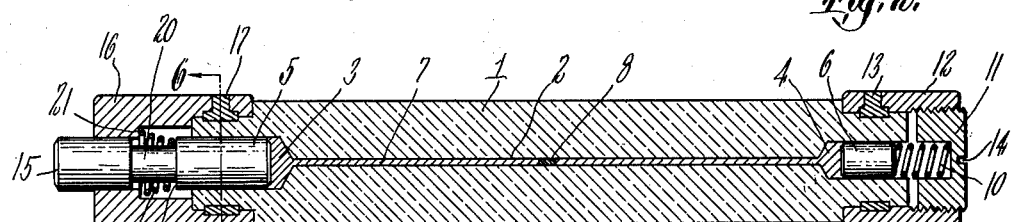
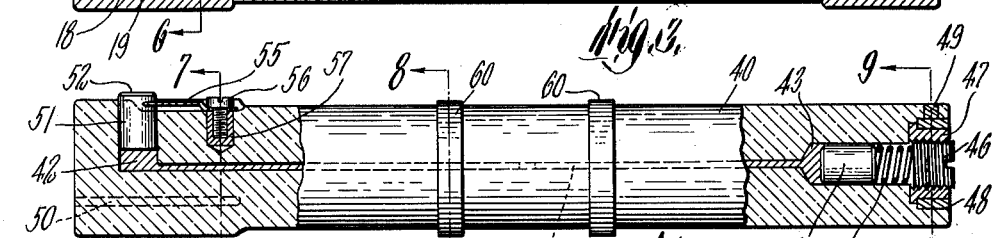
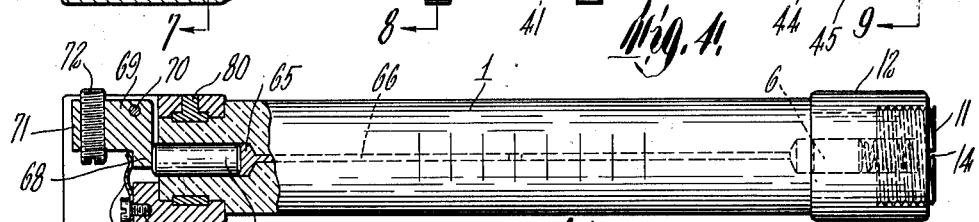
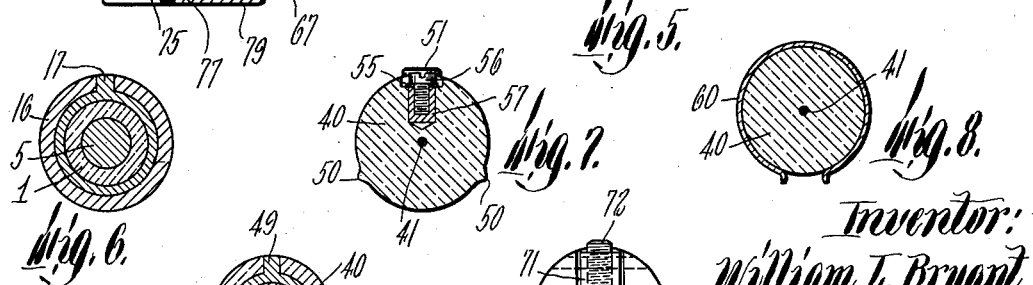
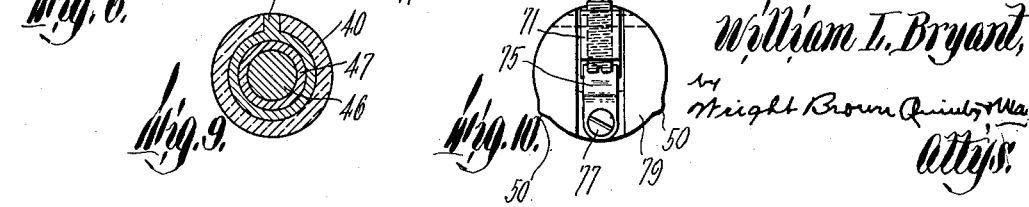
Inventor:
William L. Bryant,
by Wright Brown Quinby Ma
attys.

Patented June 6, 1933

1,912,618

UNITED STATES PATENT OFFICE

WILLIAM L. BRYANT, OF SPRINGFIELD, VERMONT; BLANCHE B. BRYANT, OF SPRINGFIELD, VERMONT, ADMINISTRATRIX OF SAID WILLIAM L. BRYANT, DECEASED, ASSIGNOR TO BRYANT CHUCKING GRINDER COMPANY, OF SPRINGFIELD, VERMONT, A CORPORATION OF VERMONT

GAUGE

Application filed December 12, 1928. Serial No. 325,549.

This invention relates to gauges for accurate indication of small variations from standard dimensions and of that type wherein such variations are given a multiplied indication by the use of a liquid column. According to the present invention the passage for the liquid is entirely filled thereby so that the liquid column is fully enclosed thus enabling the gauge to be useable in any angular position, a wall portion yielding resiliently when the column is moved bodily due to changes in the dimension being measured. By this means the integrity of the liquid column is preserved and greater accuracies obtained since there is no gas at one end of the column which may leak off and become lost. The liquid column may have portions colored with immiscible colors to thereby provide an indication of the position of the column, or a rider movable with the liquid passage as the column is moved may be employed, either the rider or the color demarcation indicating on a suitable scale and to a greatly magnified extent the movement of the column resulting from a change in a dimension to be measured.

For a more complete understanding of this invention reference may be had to the accompanying drawing in which Figure 1 is an elevation of the gauge in operative relation to work, the work being shown in section.

Figure 2 is a section on line 2—2 of Figure 1.

Figure 3 is a longitudinal central section through the gauge of Figures 1 and 2.

Figures 4 and 5 are elevations partly in section showing modified constructions, particularly intended for measuring internal diameters.

Figure 6 is a section on line 6—6 of Figure 3.

Figures 7, 8 and 9 are sections on lines 7—7, 8—8 and 9—9, respectively, of Figure 4.

Figure 10 is an end elevation of the construction shown in Figure 5.

Referring first to the construction shown in Figures 1 to 3, the gauge comprises an elongated body 1 of glass or other suitable transparent material having a passage 2 longitudinally therethrough and of relatively small diameter joining a pair of chambers 3 and 4 of considerably larger diameter. These chambers 3 and 4 are of variable volume and for this purpose they are shown as having therein plugs 5 and 6 which act as pistons sliding in the enlarged bores which form the side walls of the chambers. Filling the chambers and the passage 2 between the plugs 5 and 6 is a liquid column 7. This column may be of two colors, the liquids having the colors being immiscible, in order to indicate a line of demarcation, the position of which longitudinally of the body will show the position of the liquid column, or if desired a short piston 8 may be interposed in the column, this piston either being of transparent material or material so colored that its position can be readily distinguished in the passage 2.

The plug 6 is shown as normally yieldingly pressed inwardly toward the passage 2 by means of a spring 10. This spring as shown reacts between the outer end of the plug 6 and a plug 11 having threaded engagement with a sleeve 12. The inner end of this sleeve is fixed to the end portion of the body 1 as by a suitable cement 13 lying in mating grooves in the body 1 and in the sleeve. The plug 11 is shown as provided with a slot 14 on its outer end to receive a suitable tool by which it may be turned thus to adjust the pressure which the spring 10 exerts against the plug 6. The plug 5 is shown as provided with an extension 15 which projects outwardly of a cap 16 fixed to the adjacent end of the body 1 as by means of a mass of cement 17 of any suitable type engaging in mating grooves externally of the body 1 and internally of the cap 16 similar to the body of cement 13 which retains the sleeve 12 in position. The plug 5 is normally pressed inwardly as by means of a spring 18, one end portion of which engages a shoulder 19 at the inner end of a portion 20 of reduced diameter, the opposite end of this spring bearing against an internal shoulder 21 of the cap 16. The spring 10 is formed or adjusted to exert a stronger pressure on the plug 6 than the spring 18 exerts against the plug 5, so that the work engaging portion 15 is normally projected outwardly from the cap 16, the chamber 3 being expanded and the chamber 4 contracted.

This form of the gauge is particularly useful for testing the concentricity of revolving parts and it is shown as mounted for this purpose in Figures 1 and 2. Referring to these figures, at 25 is a base plate from which extends a post 26 which may if desired be threaded into the plate 25. This post 26 is shown as having adjustably carried thereby a split clamp 27 which may be fixed in adjusted position vertically on the post 26 as by means of the clamping screw 28. This clamp 27 has a split jaw portion 30 to receive the body 1 which may be fixed therein by tightening the clamping screw 31. The base 25 carrying the gauge is then brought up to the work 35 until the work-engaging portion 15 presses thereagainst and moves the liquid column to the desired amount toward the opposite end of the gauge, the plug 6 retracting against the pressure of the spring 10. The work is then revolved and any eccentricity is indicated by a corresponding movement of the plug 5 which gives a magnified indication of such eccentricity by the position of the liquid column within the body 1. In order to facilitate a comparison the body 1 may be provided with graduations as at 36 along one side, the position of the column being viewed from the same side so that the indicator 8 or the line of demarcation between the two colors of the liquid show clearly with relation to the graduations.

In Figures 4, 5 and 7 to 10 gauge constructions are shown particularly suitable for measuring internal diameters. Referring to the construction shown in Figures 4 and 7 to 9 inclusive, the body 40 is provided with a passage 41 of relatively small diameter between end chambers 42 and 43 of larger diameter. The chamber 43 is of variable volume, having a plug 44 slidable therein and normally pressed inwardly to contract this chamber by means of the spring 45 reacting between the plug 44 and the plug 46 threaded into the collar 47, which is shown as fixed in an enlarged opening 48 in the end of the body 40. The fixing of the collar 47 may be accomplished as by means of the mass of cement 49, similar to the manner in which the sleeve 12 and the cap 16 of the constructions shown in Figure 3 are secured. The other end of the body 40 is provided with a pair of rigid spaced ribs 50 which may engage the internal wall of the work and between and opposite to these ribs 50 is a retractible plug 51 having a work engaging face 52. The plug 51 and the ribs 50 are designed to bear substantially equally spaced against the internal wall of a hole to be measured, these parts furnishing a three point bearing thereon. The plug 51 is shown as slidably supported in the chamber 42 to bear against the liquid in this chamber which extends through the passage 41 and into the chamber 43. This plug is normally held against the body of liquid as by means of a leaf spring 55 engaging the plug near its outer end and fixed as by means of a screw 56 in a socket member 57 cemented or otherwise fixed in a suitable opening in the body 40. The spring 45 is stronger than the spring 55 so that the plug 52 is normally projected outwardly so that it may be engaged and pressed inwardly when that end portion of the gauge is thrust into the hole to be gauged. When this occurs the plug 51 is pushed inwardly to an extent depending on the size of the hole and the liquid column in the passage 41 is moved toward the opposite end of the gauge, the spring 45 and plug 44 yielding to permit this movement to take place. The liquid column has a suitable indicator such as that shown at 8 in Figure 1, or it may comprise two immiscible liquids of different colors, and the position of the indicator may be read with relation to graduation marks on the body 40 such as is shown at 36 in Figure 1. If desired, also, spring ring members 60 may be engaged over the body 40 and spaced apart to indicate therebetween the desired tolerance limits for the hole to be measured so that if the indicator in the liquid column lies somewhere between these rings when the gauge is in operative relation to the hole to be measured, this hole is known to be within the desired tolerance limits.

In Figure 5 a modification has been illustrated in which the plug at the measuring end of the gauge does not directly engage the work. In the construction there shown the chamber adjacent to that end of the gauge is shown at 65 in axial alinement with the fluid passage 66. The plug 67 is slidable in this chamber and its outer end is engaged by the arm 68 of a bell crank lever 69 pivoted at 70 to the body. The arm 71 of this bell crank lever has threaded therein a screw 72, the outer end of which is formed as a work engaging element, this screw being adjustable in the bell crank lever 69 as desired. The arm 68 of this bell crank lever is pressed against the outer end of the plug 67 as by means of the leaf spring 75 having its free bearing on the arm 66 and secured as by means of a screw 77 to the collar 79 which is cemented as by the ring of cement 80 to the adjacent end of the gauge body. This collar 79 is also preferably provided with ribs such as 50, as shown in Figure 7, so spaced that these ribs and the screw 71 form a three point support for the gauge within the hole to be measured.

In all these constructions it will be seen that the liquid entirely fills the chambers and passage, there being no gas pocket beyond the liquid column as has heretofore commonly been provided with gauges of the liquid column type. It will also be noted that the liquid is pressed at all times between the plugs. This pressure preserves the integrity of the liquid column and makes it possible to use a liquid such as mercury instead of a liquid like alcohol such as is commonly employed. The spring pressed plugs provide a more practicable means for holding definite pressure than a gas which is subject to leakage.

While the tolerance rings have been shown with reference to the construction of Figures 4 and 8 only, it should of course be evident that they may be applied to any of the constructions illustrated and may of course be used in connection with other gauges of the liquid column type if desired. It will also be noted that the plug construction at the opposite end of the gauge from the gauging elements in Figure 5 is shown of the same type as is illustrated in Figure 3, although of course it might if desired be made according to the construction of Figure 4.

Certain embodiments of this invention having thus been described it should be evident to those skilled in the art that various changes and modifications might be made therein without departing from the spirit or scope of this invention as defined by the appended claims.

I claim:

1. A gauge comprising an elongated body of transparent material having chambers adjacent to opposite ends and a passage of small diameter extending longitudinally thereof between said chambers, a plug slidably mounted in each of said chambers, the inner end of each plug acting as a piston for its respective chamber, a column of liquid filling said chambers and passage, sliding of said plugs acting to contract or expand the volume of their respective chambers, springs for forcing said plugs inwardly to maintain the integrity of said column of liquid, one of said springs being weaker than the other whereby said column is normally positioned toward the corresponding end of said body, a work engaging element operatively related to the plug at said end whereby pressure of the work thereon will effect movement of said column toward the opposite end of said body, said liquid column including indicator means.

2. A gauge comprising an elongated body having a passage of small diameter and having a transparent wall extending longitudinally thereof and chambers at opposite ends of said passage and connected by said passage, a plug slidably mounted at each end of said body and each forming a wall of one of said chambers, a threaded plug in one end portion of said body, a spring reacting between said threaded plug and the adjacent slidable plug and pressing said slidable plug into its chamber, and a work engaging element in operative relation to the other slidable plug, a liquid filling said chambers and passage, and means in said passage for indicating movement of liquid therein.

3. A gauge comprising an elongated body of transparent material having chambers adjacent to opposite ends and a passage of small diameter extending longitudinally thereof between said chambers, a plug slidably mounted in each of said chambers, the inner end of each plug acting as a piston for its respective chamber, a column of liquid filling said chambers and passage, sliding of said plugs acting to contract or expand the volume of their respective chambers, springs for forcing said plugs inwardly to maintain the integrity of said column of liquid, one of said springs being weaker than the other whereby said column is normally positioned toward the corresponding end of said body, a member pivotally carried by said body, said member bearing on the plug at said end and against which said weaker spring presses, and a work-contacting element carried by said member.

4. A gauge comprising an elongated body of transparent material having chambers adjacent to opposite ends and a passage of small diameter extending longitudinally thereof between said chambers, a plug slidably mounted in each of said chambers, the inner end of each plug acting as a piston for its respective chamber, a column of liquid filling said chambers and passage, sliding of said plugs acting to contract or expand the volume of their respective chambers, springs for forcing said plugs inwardly to maintain the integrity of said column of liquid, one of said springs being weaker than the other whereby said column is normally positioned toward the corresponding end of said body, a member pivotally carried by said body; said member bearing on the plug at said end and against which said weaker spring presses, and a work-contacting element carried by said member in position to be movable by the rocking of said member at an angle to the direction of movement of the adjacent plug.

In testimony whereof I have affixed my signature.

WILLIAM L. BRYANT.